US012802190B2

(12) United States Patent
Ramírez Vicente et al.

(10) Patent No.: US 12,802,190 B2
(45) Date of Patent: Nov. 17, 2026

(54) METHOD FOR DETECTING SYNTHETIC CONTENT IN VIDEOS

(71) Applicant: TELEFONICA INNOVACION DIGITAL, S.L.U., Madrid (ES)

(72) Inventors: Francisco José Ramírez Vicente, Madrid (ES); Javier Del Pino Díaz, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 295 days.

(21) Appl. No.: 18/443,920

(22) Filed: Feb. 16, 2024

(65) Prior Publication Data

US 2024/0281945 A1 Aug. 22, 2024

(30) Foreign Application Priority Data

Feb. 17, 2023 (EP) .................................... 23382153
Jun. 13, 2023 (EP) .................................... 23179069

(51) Int. Cl.
*G06T 7/00* (2017.01)
*G06T 7/246* (2017.01)
(Continued)

(52) U.S. Cl.
CPC ............ *G06T 7/0002* (2013.01); *G06T 7/246* (2017.01); *G06T 7/68* (2017.01); *G06T 7/73* (2017.01);
(Continued)

(58) Field of Classification Search
CPC ......... G06T 7/0002; G06T 7/246; G06T 7/68; G06T 7/73; G06T 2207/10016;
(Continued)

(56) References Cited

U.S. PATENT DOCUMENTS 11,527,106 B1 12/2022 Raman
2018/0349682 A1* 12/2018 Wong .................. G06V 40/172
(Continued)

FOREIGN PATENT DOCUMENTS

KR 102286468 B1 8/2021
WO WO-2021227360 A1 * 11/2021 .......... G06V 10/751

OTHER PUBLICATIONS

Yang et al., "Exposing Deep Fakes Using Inconsistent Head Poses", arXiv:1811.00661v2 [cs.CV] Nov. 13, 2018 (Year: 2018).*
(Continued)

*Primary Examiner* — Chan S Park
*Assistant Examiner* — Daniel C Chang
(74) *Attorney, Agent, or Firm* — Osha Bergman Watanabe & Burton LLP

(57) ABSTRACT

A method of synthetic content detection in real-time, from a video input source providing images containing at least one human's body part (comprising the head), implemented as a lightweight deepfake detector with a user interface comprising: obtaining 3D points corresponding to the at least one body part and collecting information of the obtained 3D points; calculating 3D vectors comprising information of position and movement of the points to detect spatial positions of the body part; detecting anomalies by comparing the calculated vectors with reference information of the body part stored in matrices and verifying at least one criterion: eye blink from eye detection and/or head pose from 3D projection of the body part comprising the head; providing in real-time a result; indicating whether synthetic content is detected in the video based on the detected anomalies and each verified criterion.

15 Claims, 5 Drawing Sheets

(51) Int. Cl.
*G06T 7/68* (2017.01)
*G06T 7/73* (2017.01)

(52) U.S. Cl.
CPC ............... *G06T 2207/10016* (2013.01); *G06T 2207/30201* (2013.01)

(58) Field of Classification Search
CPC .......... G06T 2207/30201; G06V 20/40; G06V 40/18; G06V 40/40; G06V 40/165
See application file for complete search history.

(56) References Cited

U.S. PATENT DOCUMENTS

| | | | | |
|---|---|---|---|---|
| 2021/0327431 | A1* | 10/2021 | Stewart | G06V 40/45 |
| 2022/0207263 | A1 | 6/2022 | Vexler et al. | |
| 2022/0277596 | A1* | 9/2022 | Li | G06T 7/74 |
| 2022/0309836 | A1* | 9/2022 | Gao | G06V 40/45 |
| 2024/0127630 | A1* | 4/2024 | Michaeli | G06V 10/764 |
| 2024/0257326 | A1* | 8/2024 | Kondo | G06T 3/60 |

OTHER PUBLICATIONS

Guan et al., "Robust Face-Swap Detection Based on 3D Facial Shape Information", arXiv:2104.13665v1 [cs.CV] Apr. 28, 2021 (Year: 2021).*

Nguyen et al., "Deep Learning for Deepfakes Creation and Detection: A Survey"; Computer Vision and Image Understanding, 223 (2022) (19 pages).

Li et al., "Seeing Your Face Is Not Enough: An Inertial Sensor-Based Liveness Detection for Face Authentication"; CCS '15: Proceedings of the 22nd ACM SIGSAC Conference on Computer and Communications Security; pp. 1558-1569 (2015) (12 pages).

Yang et al., "Exposing Deep Fakes Using Inconsistent Head Poses"; ICASSP 2019—2019 IEEE International Conference on Acoustics, Speech and Signal Processing (2019) (4 pages).

European Search Report issued in corresponding EP application No. EP23179069 dated Nov. 24, 2023 (5 pages).

* cited by examiner

METHOD FOR DETECTING SYNTHETIC CONTENT IN VIDEOS

This application claims priority to European application No. 23382153.7 filed on Feb. 17, 2023, and to European application No. 23179069.2 filed on Jun. 13, 2023, the whole content of this application being incorporated herein by reference for all purposes.

TECHNICAL FIELD

The present invention relates generally to computing systems and, specifically, has its application within the detection of synthetic content in videos, e.g., deep fakes.

BACKGROUND OF THE INVENTION

Synthetic video is the term used for any computer-generated video that has been manipulated to appear "real." Most people have also adopted the term "deep fake" to refer to any content—often video or audio in nature—that has been manipulated to look like something it is not.

The proliferation of scams using deepfakes is a problem that can affect the entire world population. Moreover, the main element that can be affected is video calls.

Therefore, it is important to create applications that detect deepfakes, as in the very near future, it will be essential to know if we are talking with a real person or whether the video that has been sent to us contains images of a real person or not. Deepfake algorithms can create fake images and videos that humans cannot distinguish them from authentic ones.

The famous deep fake Obama video warning us about deep fakes going viral may be the most innocent example, but there are far more devastating real-world examples which impact the society by introducing inauthentic content.

The threats associated with the advancement of Artificial Intelligence in the field of deep fakes require developing tools to help detect them. So far, just proofs of concept and academic papers are available, but final users require simple tools that can be executed in any type of device, even mobile phones with limited computation power.

Some existing solutions uses Machine Learning. For example, "Deep Learning for Deepfakes Creation and Detection: A Survey" by Thanh Thi Nguyen et al. (Computer Vision and Image Understanding, Volume 223, October 2022, 103525) discloses a survey of algorithms used to create deepfakes and, more importantly, methods proposed to detect deepfakes in the literature to date. The survey shows that deepfakes can be created easier than ever before with the support of deep learning and is also quicker thanks to the development of social media platforms. Deepfake detection is normally deemed a binary classification problem where classifiers are used to classify between authentic videos and tampered ones. This kind of methods requires a large database of real and fake videos to train classification models. The number of fake videos is increasingly available, but it is still limited in terms of setting a benchmark for validating various detection methods.

The biggest problem with existing deepfakes detection solutions is that they are based on Machine Learning (ML) algorithms, which detect anomalies, artifacts, etc., in the images generated with deepfake techniques, but the complexity of these solutions and the large computational processing involved often render them inaccessible and impractical; some models even need to be executed with help of multiple GPUs (graphics processing units). For this reason, if the user has a device with limited processing power, it is not possible for the user to use these ML algorithms. Moreover, numerous deepfake detection applications are limited to GitHub repositories, featuring intricate implementations that pose considerable hurdles for non-expert users.

Summarizing, the surge of deep fake-driven scams is an emerging global issue that poses a significant threat to the world's population, with video calls being a primary target, and discerning the authenticity of video content becomes paramount.

Therefore, there is a need of providing a detector of deepfakes without using Machine Learning techniques.

SUMMARY OF THE INVENTION

The problems found in prior art techniques are generally solved or circumvented, and technical advantages are generally achieved, by the disclosed embodiments which provide a lightweight deepfake detector configured to analyze a video in real time for detecting indicia of synthetic origin.

The present invention allows unmasking deepfakes, transcending the confines of conventional machine learning techniques and harnessing the power of intricate mathematical calculations involving 3D vectors. The present invention provides a deepfake detection method which leverages motion analysis and spatial elements, steering clear of traditional machine learning techniques, by scrutinizing critical factors such as head movement, facial symmetry, and blink rates to ascertain the veracity of video content-distinguishing between genuine and tampered footage with remarkable precision. The true allure of this invention lies in its unparalleled speed and accuracy, eliminating the need for detailed mathematical computations or cumbersome machine-learning models. As a result, the present invention paves the way for a more efficient and seamless deepfake detection process, empowering users to unmask deceptively manipulated content in the digital age swiftly.

An aspect of the present invention refers to a computer-implemented method for detecting synthetic content in videos which is defined by the independent claim. The dependent claims define advantageous embodiments.

The present description should therefore be interpreted as extending the disclosures of the references cited in the background of the invention, and therefore the scope of this disclosure is not limited to detection of deepfake video in the particular manner described, and is rather extended to the application of components of the present disclosure to augment the existing technologies.

The method in accordance with the above-described aspects of the invention has a number of advantages with respect to the aforementioned prior art, which can be summarized as follows:

- The speed and fluidity of execution, as it does not require extensive mathematical calculations or the need to use heavy Machine Learning models. Faster calculation: Detection without machine learning is based on mathematical calculations and does not require a training process, which can result in faster detection.
- The present invention can be used in real-time to check, for example, calls from any video call platform (including video files). The invention allows the creation of a lightweight application capable of detecting deepfakes from any source (video call, video file, etc.) that anyone can use.
- Greater transparency: By not using machine learning, detection is based solely on mathematical calculations and not on a complex, opaque model.

Another advantage of using deepfake detection based on head movements and vector-detected blinking without using machine learning is that, since it does not require a training process, it may be easier to implement in environments where the availability of labelled data is limited or non-existent. This could result in a more accessible detection system for companies or institutions that do not have the capacity or resources to train a machine-learning model.

High accuracy: detecting these anomalous movements in a human being is a very high sign of a possible deepfake.

Possible use in devices with limited resources: Being a lighter and faster process, this type of detection could be suitable for devices with limited resources, such as cell phones or surveillance cameras. Since the proposed detection method is based on motion and other spatial elements and not uses Machine Learning for detection, the proposed method can be added as an additional layer to applications, devices, etc. to provide users with the tools to confidently determine whether they are engaging with genuine individuals or falling prey to deepfake deceptions.

The present invention can be integrated as an additional security layer within applications, devices, and other platforms, bolstering their defences against deepfake attacks. Furthermore, the proposed detection method of synthetic content in videos is compatible with all video call programs on the market, including video files, and accessible to a broader audience as a user-centric application with a lightweight design for identifying deepfakes from many sources. In addition to increasing accessibility, the present invention emphasizes real-time deepfake detection, enabling users to stay vigilant and safeguard their digital interactions from the perils of manipulated content. By eliminating the need for specialized knowledge or extensive resources, individuals are empowered to take control of their digital security and counter deepfake threats with greater confidence and efficiency.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF EMBODIMENTS

Figure 1:
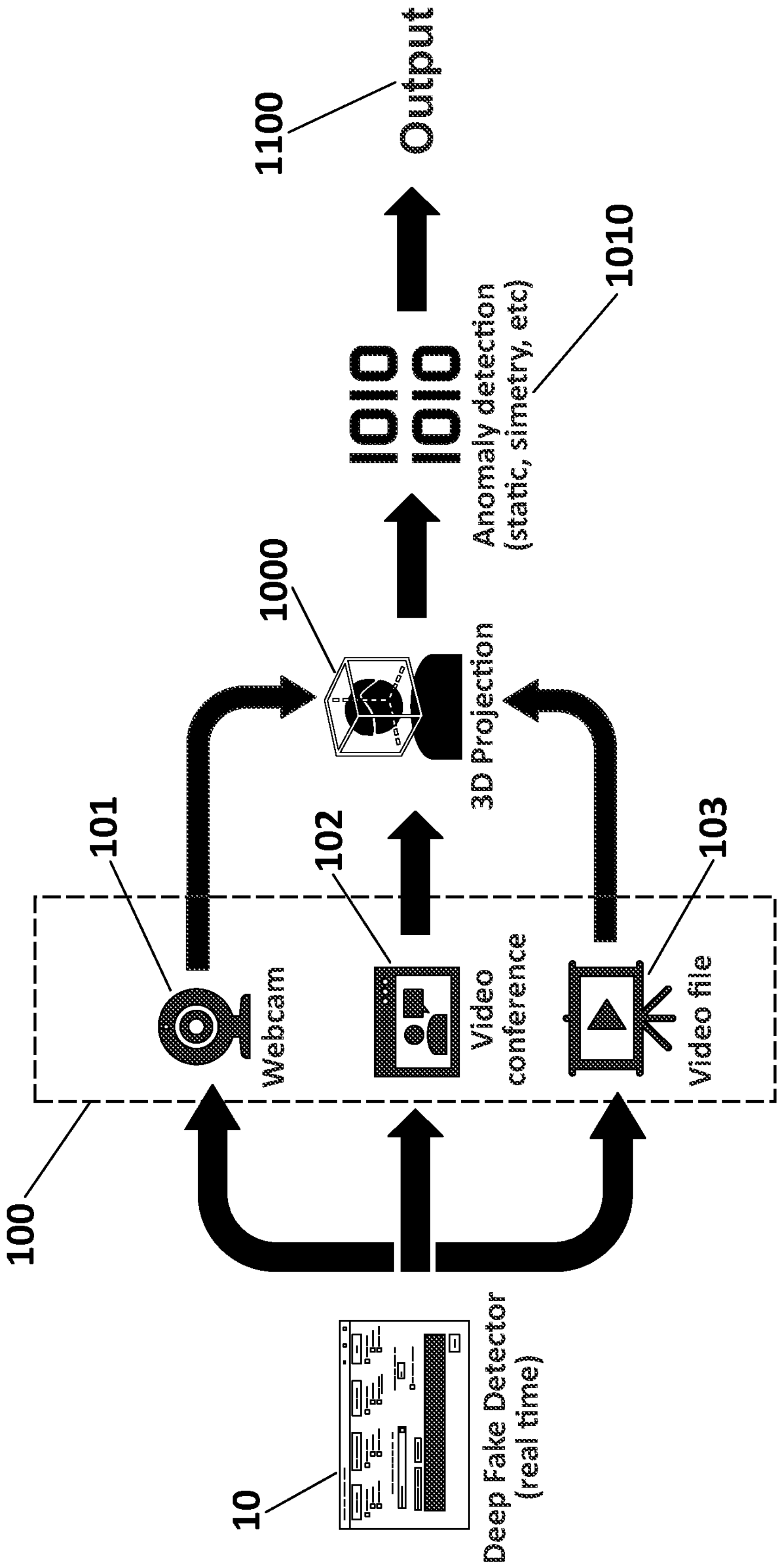
FIG. 1 shows a block diagram of a system architecture for verifying the head pose, according to a possible embodiment of the present invention for detecting deepfake.

The present invention may be embodied in other specific systems and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The embodiments of the present invention propose deep fake detection methods based on mathematical calculations of 3D (three-dimensional) vectors by checking their translation, rotation, etc., trajectories. These trajectories allow to determine that the head motion is natural, that it is not too long still or looking at a stationary point, to determine the symmetry of the face, to calculate blinks, etc.

The embodiments of the present invention can be implemented in a software application that can analyze any software application running in a personal computer (PC), mobile phone or any other smart device, which is capable of playing a video or directly a call from any videoconferencing platform. Videoconference calls are the ideal place to try to fool someone using deepfakes.

The proposed fake detection method can obtain the image to be analyzed from a webcam or other camera or video capturing means. In a first analysis performed by at least one processor, one or more body parts of a subject (e.g., head, the whole face, eyes, mouth or lips, hands, torso, etc.) are detected. In addition, the method can obtain information captured from, for example, a video executed with a player. The obtained images and information are optimized so that the method does not require a more limited computational capacity than other examples that use Machine Learning techniques. The method comprises calculating 3D vectors, their position, and movement to detect different spatial positions of the head, eyes, hands, etc.

In a possible implementation, the method can be programmed in Python in a Windows environment where a user interface is created to interact with the users, which provides simplicity when performing the detection operations. The detection and possible confirmation of whether the interlocutor is a real human are based on several criteria as detailed further below. As already mentioned, a main goal is to implement a deepfake detector application as light as possible to run on any mid-range PC user.

The method of this invention comprises two main types of verifications, a first one related to the head pose, and a second one related to the eye blinking. In turn, the head pose verification can be implemented by i) analyzing static motion factors, ii) analyzing facial symmetry, iii) detecting head abrupt turns, iv) detecting other parts of the body and their motion, v) checking with the focal point, vi) emotion detection, and/or vii) lip movement analysis.

The first two implementations of head pose verification (i) static motion factors and ii) facial symmetry) use 3D vector calculations to perform different computations. The verification process described here is called "Head Pose verification" but goes beyond its definition as it is not only centered on the head, but it can be expanded to all parts of the human's body.

The goal with the head pose verification is to offer a new approach to detect anomalies in real time, e.g., during a video call, to check that the person in front of the user(s) is 100% human. Furthermore, this new approach mainly uses 3D positioning of various points of the face, eyes, mouth, and even hands and torso. All this information is collected in real-time from the webcam or directly from a previously recorded video. Once these positions have been estimated in a 3D space, they are stored in matrices for further calculation or processing. In addition, the method of head pose verification computes a focal point projection that starts from the nose to detect the exact point on the screen where the person under analysis is looking. All this information is accessible in real-time, so the second part is to designate those movement patterns that are not classified as "human." It is also important to note that the whole system is adjusted to the frames per second of the image capture, as it is better to calibrate the anomaly detection process by having the frame rate under our control. The calibration by frames, in addition to the time allotted for checking, determines the final result. A checking in real time is performed to determine if the 3D points of the face and the projection do not meet some requirements to assign them as "anomalous." Finally, depending on the time of the test, a weighted result is offered according to the detected anomalies.

On the other hand, the blink verification uses the same basic approach as above, i.e., obtain the 2D points of the eye, label them, and check when these points come close to each other, this closeness implying a blink. Each blink is accounted for within the assigned framerate and checking time. The final result is checked between the different tolerances within the human being, the previously defined tolerance values determined by using several thresholds.

In order to calculate the movements of the different captured 3D points, geometry and linear algebra techniques are used; in particular, the camera projection matrix, which relates the 3D points in space to their 2D projections in the image, is used. Using this matrix, the relative position and orientation of the camera in each frame of the video are calculated and then the motions of the different points are inferred.

The translation is simply the movement of an object along a straight line in space in the x, y, and z directions. The translation of a point (x, y, z) in terms of vectors can be represented as:

$$[x', y', z'] = [x, y, z] + [tx, ty, tz]$$

where [tx, ty, tz] are the translational distances in the x, y, and z directions. Rotation is the motion of an object around an axis in space. The rotation of a point can be represented in terms of rotation matrices. A rotation matrix is a 3×3 matrix that defines how points are rotated around each x, y, and z-axis. The rotation matrix depends on the rotation angle and the axis around which it is rotated. The rotation of a point (x, y, z) around the x-axis by an angle theta can be represented in terms of matrices such as:

$$\begin{bmatrix} x' \\ y' \\ z' \end{bmatrix} = \begin{bmatrix} 1 & 0 & 0 \\ 0 & \cos(\text{theta}) & -\sin(\text{theta}) \\ 0 & \sin(\text{theta}) & \cos(\text{theta}) \end{bmatrix} * \begin{bmatrix} x \\ y \\ z \end{bmatrix}$$

The same can be computed for the y and z axes and the rotation matrices can be combined to make rotations around multiple axes.

To merge translational and rotational motions, a homogeneous transformation matrix can be used: a 4×4 matrix that includes translation and rotation. The homogeneous transformation matrix can be represented as follows:

$$\begin{bmatrix} R & t \\ 0 & 1 \end{bmatrix}$$

where R is the rotation matrix, and t is the translation vector. The transformation matrix is applied to a point in homogeneous coordinates [x, y, z, 1] to obtain the transformed point in homogeneous coordinates [x', y', z', 1]. Then first three components of this homogeneous vector can be divided by the fourth component to obtain the transformed coordinates of the point.

In summary, the motions of the different captured 3D points can be calculated using a combination of translation and rotation, and these motions can be represented using homogeneous transformation matrices. These are the base calculations to detect anomalies in human motion.

HEAD POSE VERIFICATION The basic scheme of operation of head pose verification (head position) is shown in FIG. 1. In this schematic diagram, a video content is input in real time, by the user using a graphical user interface (10), into the deepfake detector from different input sources (100) which are shown in FIG. 1, for example: webcam (101), videoconference (102), and video file (103). Once the input source (100) has been assigned by the user, the tridimensional projection process (1000) comprising the vectorization of the position of the points of the face and the projection of the nose, as shown in the real example of FIG. 2, begins. Once the 3D projection (1000) is obtained, the detection of one or more anomalies (1010) for head pose verification (e.g., static motion factors, facial symmetry, head abrupt turns, other parts of the body and their motion, the focal point, emotions and movements of the lips) is performed to output a final result (1100) indicating data about a deepfake based on the head pose verification.

Figure 2:
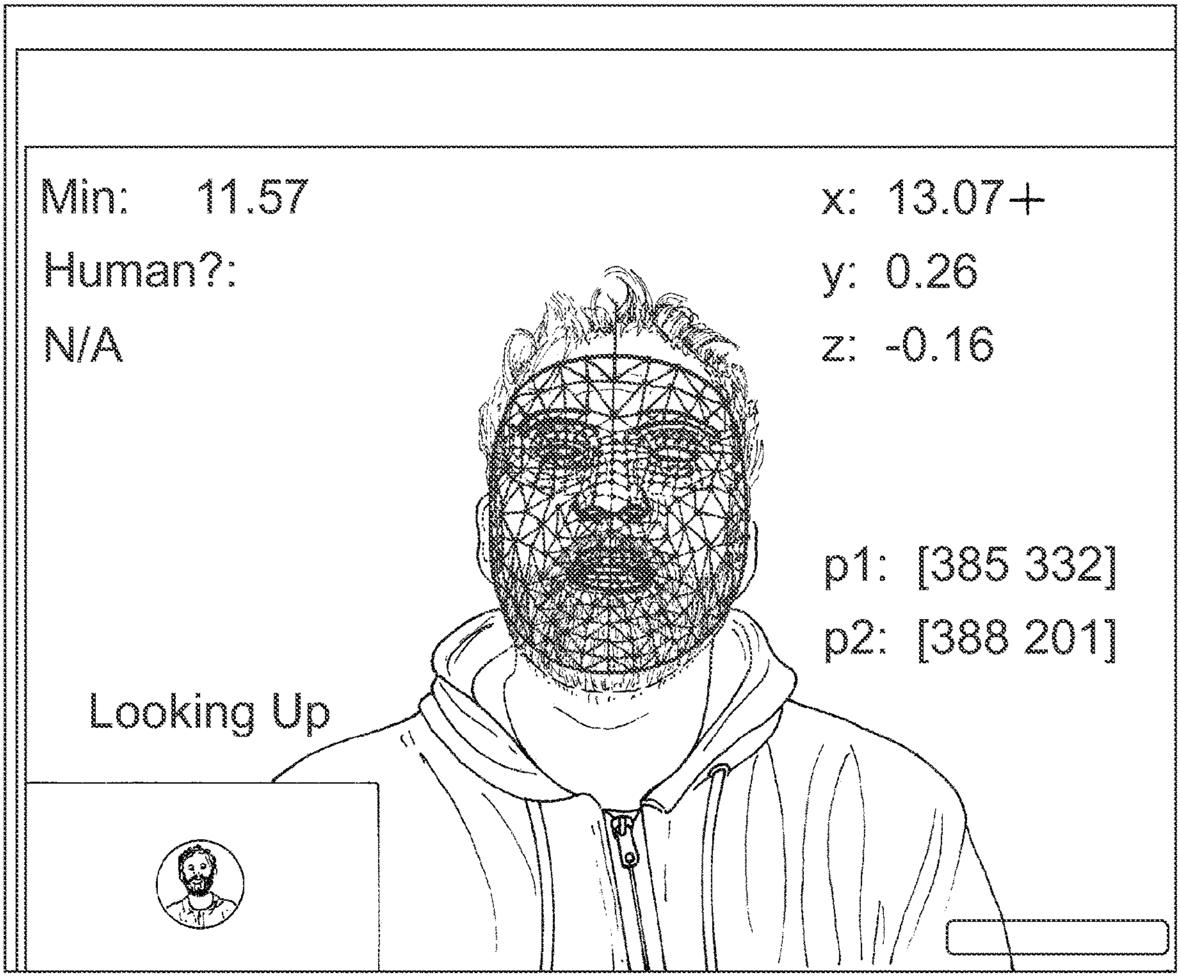
FIG. 2 shows a picture of a graphical user interface showing the face point capture and projection of the nose to a focal point.

The picture of FIG. 2 shows the points of a subject's face as well as the different 3D values of both the head and the focal point that starts from his nose, which allow, among other things, the determination of the point at which the subject is looking (front, right, left, etc.). The user interface displays the capture of the 3D points of the left and right eyes (for example, in different colors). Once all the information obtained in this process of vectorizations and 3D projection (1000) is stored in matrices, anomaly detection (1010) is performed as described below. In a preferred embodiment, the detected anomalies are the following:

i. Static motion factors. It is common in deepfakes to always keep the gaze on the front and make as few movements as possible so that the mapping of the fake face is as perfect as possible and no cuts or artifacts are noticed. In a human conversation, making more natural and varied movements is more common. Too static movements of a body part have a speed that exceeds a predetermined first threshold.

ii. Facial symmetry. The points extracted from the subject's face are calculated. If the deepfake process fails in the slightest, this symmetry is broken, resulting in an anomaly between the distance of the different points captured or a possible manipulation of the image.

iii. Head abrupt turns. Head movements can also be captured and, taking into account the framerate, head movements that do not correspond to a natural movement of the head can be detected; i.e., jumps between one position and another which are too abrupt and not due to a too low framerate can also be detected. Too abrupt head turns have a speed that exceeds a predetermined second threshold.

iv. Detect other parts of the body and their motion. The same which applies to the face and head can be applied to the torso and hands. For example, if the hands do not appear or no movement is detected, it can also indicate a deepfake. On the other hand, a torso that is too static or, on the contrary, with abrupt movements can also be taken as an indication of a deepfake.

v. Checking with the focal point. The focal point allows the detection of a point/area/object at which the subject is looking. This can also indicate possible deepfakes if repetition in these values is detected, abrupt changes, etc.

vi. Emotion detection. Emotions are reflected in facial expressions, and certain emotions have specific movement patterns on the face. If unusual movement patterns or expressions are detected that do not match the context of the image, this may be a sign that image manipulation is occurring.

vii. Lip movement analysis. A common technique in detecting deepfakes in video conferences is lip movement analysis. This is achieved by tracking the 3D points corresponding to the lips, which are used to measure the synchronization between the lip movement and the sound of the voice. If a lack of synchronization or an unusual lip movement pattern is detected, this can mean that manipulation is occurring in the image.

It is also possible to create patterns of different poses and postures to be able to detect them later. It is also possible to create templates with complete movement sequences and then check that they correspond to real ones. This way, a collection of different movement patterns can be generated to be used in checking whether the subject behind the camera is a natural person. For example, a recording sequence can be obtained as reference information by a particular application that takes screenshots of the different movements for a time period and with different shots (to capture possible variations). This capture can be labeled as, for example, "chin scratching movement". Once the sequence is taken with several shots, it is stored in matrices, which can be used to check against the captured points in real time. The captured points are compared with the points stored in these matrices and the method checks if there is match. If the captured points and the stored points match, the method can interpret that the captured points correspond to human movements and give clues as to whether the capture is a deepfake.

In a practical example of the method, and specifically according to an exemplary implementation of the first criteria explained above, that is, detecting that the head is too static, the focal projection is used to detect that the head is too still or without movement. The focal projection we can be obtained in the following way:

First, the facial points captured in an image or video are obtained to project the position of the nose.

With the information from the facial points, the position of the nose can be indicated. The nose is usually located near the center of the face and can be detected as a series of dots in an image or video.

To project the position of the nose at a particular point, a reference point is selected.

With the information on the facial points and the selected reference point, the position of the nose can be projected at the reference point. This indicates the position of the nose relative to the reference point in each video frame.

For instance, it is assumed that, in order to project a point P on the Z-axis, given the position of point P by coordinates (x,y,z) in three-dimensional space, the x and y coordinates to project P on the Z-axis can be ignored and only the z coordinate is used. That is, the projection of P on the Z-axis (Pz) is calculated as:

$$Pz = z$$

This means that the position of the nose on the Z-axis can be obtained by simply extracting the z-coordinate of the nose point in three-dimensional space.

For example, if the position of the nose in three-dimensional space is (x,y,z)=(10, 20, 30), then the projection of the nose on the Z-axis is the z-coordinate, i.e., Pz=30. In this way, the projection of the nose on a specific reference point can be easily obtained to detect unusual movements on that axis.

The example focuses only on the the Z-axis but can be also applied to the X-axis or the Y-axis in a simple way using the same logic.

Once the nose projection is obtained, the following algorithm can be used to check whether the head is practically stationary or its movements are very static/still:

1. Calculate the projection of the nose on the Z-axis: To detect too low movement, the projection of the nose on the Z-axis is used to determine the depth of the nose relative to a reference point. The projection of the nose on the Z-axis can be obtained by simply extracting the z-coordinate of the nasal point in three-dimensional space.
2. Define a motion threshold: To detect too low motion, a threshold is defined as a limit value that indicates the amount of motion allowed to be considered as natural motion (in contrast to artificial motion of a synthetic-image or video-content). If the nose projection is less than the motion threshold for a given time, then it can be inferred that the motion is too low and that the image or video may be a deepfake.
3. Calculate the difference between the projection of the nose per frame: To detect nose movement over time, the difference between the projection of the nose in successive frames is calculated. If the difference is less than the motion threshold, then it can be inferred that the motion is too low, and the image or video may be a deepfake.
4. Generate a possible detection: If a too-low motion is detected, an alert can be generated to notify the user that the image or video may be a deepfake.

A possible implementation in pseudocode is the following:

Calculate the nose position in Z-axis as the projection of the nose on the Z-axis;

Initialize the nose position in Z-axis to current position;

Initialize the static time, i.e. time in which the nose has not moved over a threshold, to 0;

Then every time unit:

Calculate the difference between the current and previous nose positions in Z-axis and:

if that different exceeds a predetermined movement threshold then reinitialize the static time to 0 otherwise increment the static time in a time unit

If the static time exceeds a predetermined time threshold, then this video is marked as suspicious not to be human according to this criterium (head too static).

Or in more technical pseudocode:

```
procedure detect_low_motion(nose_position, reference_position,
threshold, time_window)
  prev_nose_z ← nose_position.z
  prev_time ← 0
  static_time ← 0
  while(video_in_run)
    current_time ← get_current_time( )
    nose_position ← get_nose_position( )
    nose_z ← nose_position.z
    time_difference ← actual_time − prev_time.
    difference_z ← abs(nose_z − prev_nose_z)
    if difference_z < threshold then
      static_time ← static_time + difference_time
    else
      static_time ← 0
    if static_time > time_window then
      alert("Possible deepfake detected: low motion")
    prev_nose_z ← nose_z
    prev_time ← current_time
  end while
end of procedure
```

Another code implementation corresponding to the detection of a head that is too static, with hardly any movement, is shown below.

```
# Too still detection
xn=int(nose_2d[0] + y * 10)
yn=int(nose_2d[1] − x * 10)
if firstreset_flag:
  xn_init=xn
  yn_init=yn
  firstreset_flag=False
nose_x=xn_init-xn
nose_y=yn_init-yn
if (nose_x > headmotionp) or (nose_x < headmotion):
  nose3d_counter=nose3d_counter+1
  print(nose3d_counter)
  firstreset_flag=True
if (nose_y > headmotionp) or (nose_y < headmotion):
  nose3d_counter=nose3d_counter+1
  print(nose3d_counter)
  firstreset_flag=True
if elapsed_time >= deeptime:
  firstreset_flag=True
  initial_time = time.time( )
  if nose3d_counter<head_flag:
    human=False
    nose3d_counter=0
  else:
    human=True
    nose3d_counter=0
```

Next, more details about the implementation of the detection of the above-mentioned anomalies for head pose verification are disclosed below.

i) Static Motion Factors

A set of position vectors (x, y, z) in real-time of a person's body part at different points in real-time is obtained (e.g. using Mediapipe solutions that can work with single images or a continuous stream of images and output body pose landmarks in image coordinates and in 3-dimensional world coordinates). To detect if the movements are too static, the differences between consecutive position vectors are computed and the magnitude of these difference vectors is measured. If the magnitude for most of these difference vectors is below a certain threshold, an output of the anomaly detection (1010) concludes that the person is not moving much, and their movement is too static. Thus, the anomaly detection (1010) considering static motion factors comprises the following steps:

Compute difference vectors:

Assuming that there are N position vectors which are denoted as $P_i=(x_i, y_i, z_i)$, where i=1, 2, . . . N, the difference vectors, $D_i$, are calculated as:

$$D_i = P_{(i+1)} - P_i = (x_{(i+1)} - x_i,\ y_{(i+1)} - y_i,\ z_{(i+1)} - z_i)$$
$$(i = 1, 2, \ldots N-1)$$

Calculate the magnitude of the difference vectors:

The magnitude of each difference vector can be calculated as follows:

$$M_i = sqrt\left((x_{(i+1)} - xi)^2 + (y_{(i+1)} - y_i)^2 + (z_{(i+1)} - z_i)^2\right)$$

Set a threshold:

The threshold value, T, represents the minimum amount of movement considered as natural movement. This value T can be adjusted according to the application/user's needs and may depend on the use case and of the body part to be checked if it is too static.

Count static movements:

For each magnitude $M_i$, check if it is below the threshold T. If it is, then count this difference vector as a static movement.

```
statics = 0 for i in range(N−1): if Mi < T: statics += 1
```

Set a percentage threshold for static movements:

A percentage threshold, P, represents the minimum percentage of static movements relative to the total number of difference vectors (N−1). If the rate of static movements is greater than or equal to the percentage threshold, P, then it is considered that the person is having too static movements.

```
static_percentage = (statics / (N−1)) * 100
if static_percentage >= P:
  print("This person has too static movements.")
else:
    print("This person has normal movements.").
```

There are many other approaches that can be implemented to detect this type of anomaly. Preferable values for the threshold range from 5 to 10 pixels. However different embodiments are possible, with different threshold values or with the threshold set in units different to pixels, for instance areas comprising several pixels.

ii) Facial Symmetry

Figure 3:
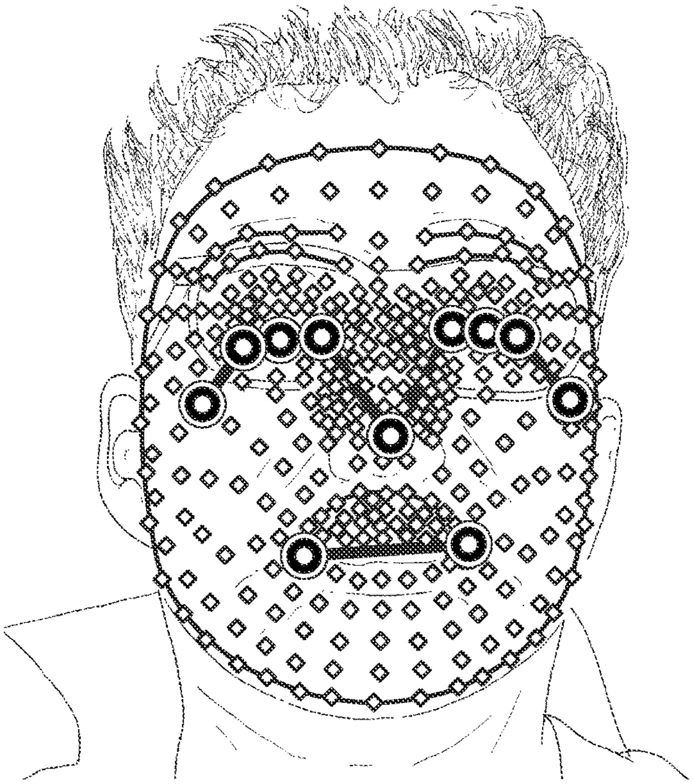
FIG. 3 shows a picture of a graphical user interface showing the different points that correspond to the person's face by identifying the eyes, mouth and face shape.

The detector can also check that the structure and composition of all the points that make up the face are not altered due to a possible manipulation with some deepfake technique. The distances between symmetric points on the face, as shown in FIG. 3, are calculated and compared over time. It is assumed that real-time position vectors (x, y, z) of facial features like eyes, mouth, nose, etc. are obtained. Thus, the anomaly detection (1010) considering facial symmetry comprises the following steps:

Identify symmetric points:

Identifying pairs of symmetric points on the face as:

Points at the outer corners of each eye.

Points at the inner corners of each eye.

Points at the corners of the mouth.

Others

These pairs of symmetric points as $S_i$ and $S'_i$, where i=1, 2, . . . , M.

Calculate distances between symmetric points:

For each pair of symmetric points, the distance between them is calculated.

$$D(P, Q) = sqrt\left((x - x')^2 + (y - y')^2 + (z - z')^2\right)$$

$D_i$=D(Si, $S'_i$), for i=1, 2, . . . , M, denoting the initial distances between the symmetric points.

Monitor changes in distances:

Recalculate the distances between the symmetric points as new real-time position vectors are received; these distances $D'_i$, where i=1, 2, . . . , M, are calculated for each new set of data.

Calculate differences in distances:

The absolute difference between the initial distances and the new distances is calculated:

$$\Delta D_i = |D_i - D'_i|, \text{ for } i = 1, 2, \ldots, M.$$

Set a threshold:

A symmetry threshold value, $T_s$, which represents the minimum amount of change in symmetry consider indicative of possible deepfake manipulation, is defined. This value $T_s$, can be adjusted according to the application/user's needs and may depend on the use case.

Check symmetry:

If any distance differences $\Delta D_i$ exceeds the symmetry threshold $T_s$, we can conclude that there is a change in symmetry and that it could be a possible error due to deepfake manipulation.

```
deepfake = False
for i in range(M):
  if ΔD_i > T_s:
    deepfake = True
```

Preferable values for the threshold range from 2 to 10 pixels. However different embodiments are possible, with different threshold values or with the threshold set in units different to pixels, for instance areas comprising several pixels.

iii) Head Abrupt Turns

To detect sudden movements of the head, the process can rely on the data described in the static movement detection point and add a factor that calculates the translation speed (acceleration) of some vectors, compare them and check that they are within limits. The velocity and acceleration of these movements are calculated using the real-time position vectors (x, y, z) and compared with established thresholds to determine if the movements are too fast or accelerated.

Calculate time differences:

Record the time at which the real-time position vectors are captured. For each pair of consecutive position vectors $P_i$ and $P_{(i+1)}$, calculate the time difference $\Delta t_i$.

Calculate velocities:

The velocity $V_i$ between two consecutive position vectors $P_i$ and $P_{(i+1)}$ can be calculated as:

$$V_i = (P_{(i+1)} - P_i)/\Delta t_i$$

$Pt_{(i+1)}-P_i$ represents the difference vector calculated above.

Calculate accelerations:

The acceleration $A_i$ between two consecutive velocities $V_i$ and $V_{(i+1)}$ can be calculated as:

$$A_i = (V_{(i+1)} - V_i)/\Delta t_i$$

Calculate magnitudes of velocities and accelerations:

Magnitude of each velocity and acceleration vector using the formula:

$$M(V_i) = sqrt\left((V_{ix})^2 + (V_{iy})^2 + (V_{iz})^2\right)$$

$$M(A_i) = sqrt\left((A_{ix})^2 + (A_{iy})^2 + (A_{iz})^2\right)$$

Set thresholds:

Two thresholds, a velocity threshold and an acceleration threshold, $T_v$ and $T_a$, are defined representing respectively the maximum human velocity and acceleration limits for the movement of the head or body part in question. These values can be adjusted according to the application/user's needs and may depend on the use case.

Check abrupt movements:

If any of the magnitudes of velocity $M(V_i)$ or acceleration $M(A_i)$ exceeds the thresholds $T_v$ and $T_a$, we can conclude that there is an overly abrupt movement, surpassing the human limit.

```
abrupt = False
for i in range(N−1):
  if M(V_i) > T_v or M(A_i) > T_a:
    abrupt = True
```

Preferable values for these thresholds are:

Maximum velocity threshold ($T_v$): 1 m/s

Maximum acceleration threshold ($T_a$): 10 m/s$^2$ iv) Detect other parts of the body and their motion This type of detection is simply modifying the source points to detect different states of motion, that is, focusing, for example, on the hands, torso, etc. To do this, the key points at these points of the body are detected and the techniques already discussed above can be applied.

Figure 4:
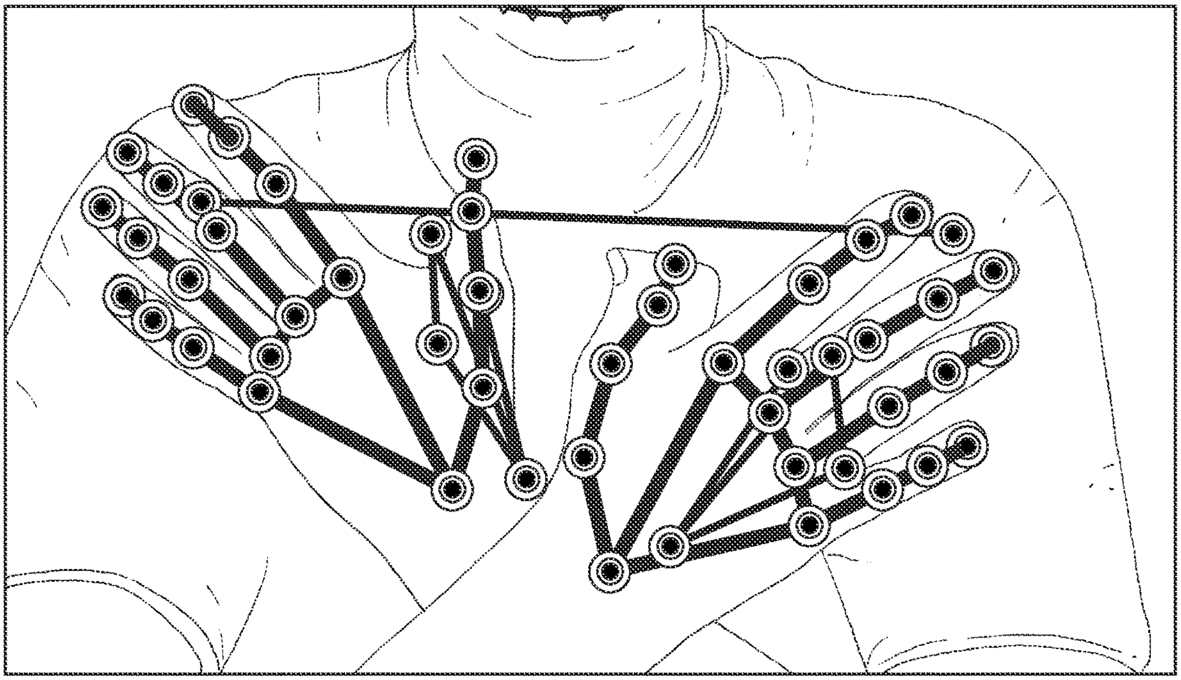
FIG. 4 shows a picture of a graphical user interface showing the points of the hand for detection and position.

An interesting approach is to see how the person uses or moves their hands, shown in FIG. 4, during the conversation. It is common for people to gesture with their hands, so the vectors that identify the hands can be used to see if the person moves or if hand movement is absent.

v) Checking with the Focal Point

The focal point where the person is looking at is calculated to be used as a base and variant to detect the above-mentioned detection techniques for head pose verification. But if the detection is focused only on the focal point, the consistency between the movements of the eyes and the direction of the focal point can be monitored. In a normal situation, the focal point also changes coherently when the person's eyes (or nose) motion. If there are inconsistencies between the movement and the focal point, it could be a sign of a deepfake. Thus, the anomaly detection (1010) considering the focal point comprises the following steps:

Identify eye position vectors:

Get each eye's real-time position vectors (x, y, z). Let's denote the left eye position as $P_L$ and the right eye position as $P_R$.

Calculate the direction of the focal point:

From the provided information, assume we already have the direction of the focal point in the form of a unit vector F.

Calculate the eyes' direction vector:

Calculate the average direction vector of the eyes, E, as the mean of the eye position vectors $P_L$ and $P_R$:

$$E = (P_L + P_R)/2$$

Calculate the angle between the eyes' direction vector and the focal point:

The angle θ between the eyes direction vector E and the focal point F using the dot product:

$$\theta = \arccos\big((E \cdot F)/(\|E\| * \|F\|)\big)$$

Here, "·" represents the dot product, and "||||" represents the vector magnitude.

Since F is a unit vector, ||F||=1, and the formula simplifies to:

$$\theta = \arccos\big(E \cdot F/\|E\|\big)$$

Monitor changes in the angle:

If the angle θ changes abruptly without a corresponding change in the eye positions or if the eyes move without changes in the angle θ, it could be a sign of a deepfake.

Set a threshold:

Define an angular threshold, $T_\theta$, which represents the maximum amount of change in the angle θ without corresponding changes in the eye positions or vice versa. This value can be adjusted according to our needs and may depend on the use case.

Check for inconsistencies:

If the change in angle θ exceeds the threshold $T_\theta$ without corresponding changes in eye positions, or if eye positions change significantly without changes in angle θ, a possible deepfake is concluded.

```
deepfake_error = False
if abs(Δθ) > Tθ and (no significant change in eye positions) or
(significant change in eye positions and no change in θ):
    deepfake_error = True
```

All this calculation can be done in the same way but with the focal point centered on the nose.

vi) Emotion Detection.

To implement this analysis, it is mandatory to create a database of vector patterns that identify the person's mood. Generic patterns or templates for laughter, sadness, etc. are calculated. To do so, we must store these different states in matrices to check them later during detection. This information can be compared with real-time facial expressions and detect inconsistencies that may indicate a deepfake. The anomaly detection (1010) considering the person's mood or emotion comprises the following steps:

Identify facial key points:

Identify critical points on the face corresponding to elements such as eyes, eyebrows, nose, mouth, and facial outline. These key points are determined by their real-time (x, y, z) coordinates.

Calculate facial features:

From these key points, calculate facial features that may be relevant for emotion analysis, such as distance between eyebrows, mouth curvature, eye-opening, etc. These features can represent the intensity of facial sentiments.

Extract expression matrices:

For each emotion in a database of emotions (laughing, crying, sad, happy, etc.) based on vectors templates, the corresponding matrix is extracted representing the critical facial points in each state.

Calculate the difference between real-time facial features and database expressions:

For each emotion matrix from the database, the difference between the real-time facial key points and those in the emotion matrix can be calculated. To measure this difference, a distance metric such as Euclidean distance can be used.

Determine the closest matching emotion:

Find the emotion in the database with the slightest difference between its matrix and the real-time facial key points. This emotion is defined as the closest match to the current facial expression.

Monitor consistency:

Monitor the consistency of the closest matching emotions and real-time facial key points over time. Abrupt and inconsistent transitions between emotions or significant changes in facial key points without a corresponding shift in sentiment may indicate a deepfake.

Set thresholds:

Define thresholds for transitions between emotions and changes in facial key points. These thresholds can be adjusted according to our needs and may depend on the use case.

Check for inconsistencies:

If emotions change abruptly without corresponding changes in facial key points, or if facial key points change significantly without changes in emotion, we could conclude that there is a possible deepfake.

vii) Lip movement analysis

```
deepfake_error = False
if (abrupt emotion change and no significant change in facial key
points)
or (significant change in facial key points and no change in emotion):
    deepfake error = True
```

To detect deepfakes using lip data in (x, y, z) vectors, a similar approach as before can be followed, focusing on the consistency and coherence of lip movements and their relationship to speech or expressions. Thus, the anomaly detection (1010) taking into account the lips and their movements comprises the following steps:

- Identify lip key points:
  - Using for example Mediapipe, identify key points on the lips that correspond to the upper lip, lower lip, and the corners of the mouth. These key points are determined by their real-time (x, y, z) coordinates.
- Calculate lip features:
  - From these key points, calculate lip features that may be relevant for detecting deepfakes, such as mouth openness, lip curvature, and the distance between the corners of the mouth. These features can represent the intensity of lip movements during speech or expressions.
- Monitor speech or expressions:
  - If the detector can access the audio data, perform speech recognition to extract the spoken words or detect specific expressions. Alternatively, the facial key points and emotion classification method from the previous examples can be used to estimate the current facial expression.
- Define expected lip movements:
  - For each speech sound or expression, define the expected lip movements or features that should be present. For example, the mouth is open wider for vowel sounds and specific expressions, while the lips are closer together for certain consonants.
- Compare real-time lip features to expected lip movements:
  - Compare the real-time lip features to the expected lip movements for the given speech sound or expression. The difference can be calculated using a distance metric, such as Euclidean distance, to measure the inconsistency between the expected and observed lip movements.
- Set thresholds:
  - Define thresholds for the difference between expected and observed lip movements. These thresholds can be adjusted according to the application/user's needs and may depend on the use case.
- Monitor consistency:
  - Monitor the consistency of the real-time lip features and their relationship to speech or expressions over time. Inconsistent lip movements or significant changes in lip features without a corresponding change in speech or expressions may indicate a deepfake.
- Check for inconsistencies:
  - If lip features change abruptly without corresponding changes in speech or expressions, or if speech or expressions change significantly without changes in lip features, a possible deepfake is concluded.

```
deepfake_error = False
If (abrupt lip feature change and no significant difference in speech or
expressions) or (significant change in speech or expressions and no change
in lip features):
    deepfake_error = True
```

Blink Verification

Figure 5:
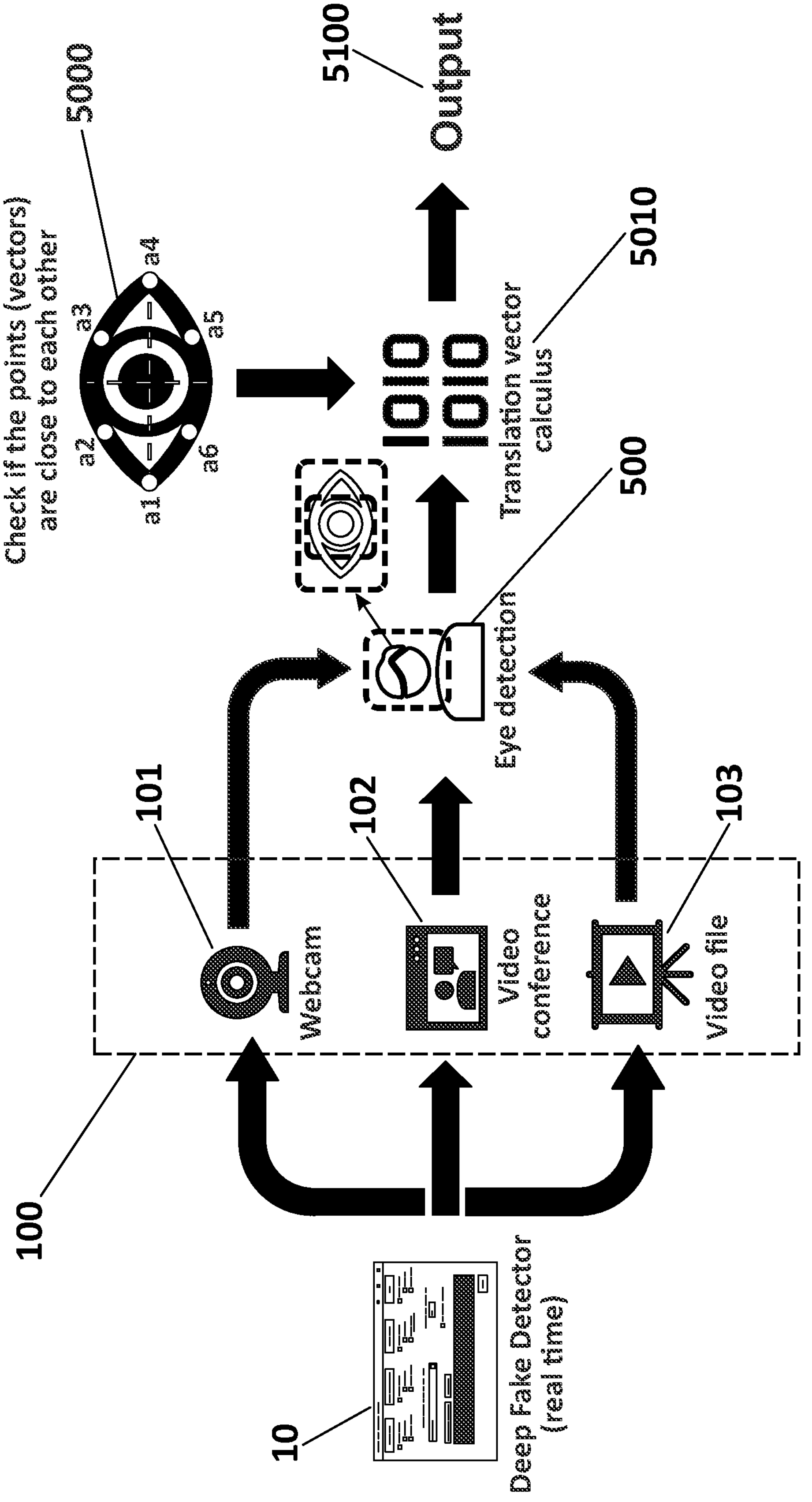
FIG. 5 shows a block diagram of a system architecture for verifying the eyes blink, according to a possible embodiment of the present invention for detecting deepfake.
Figure 6:
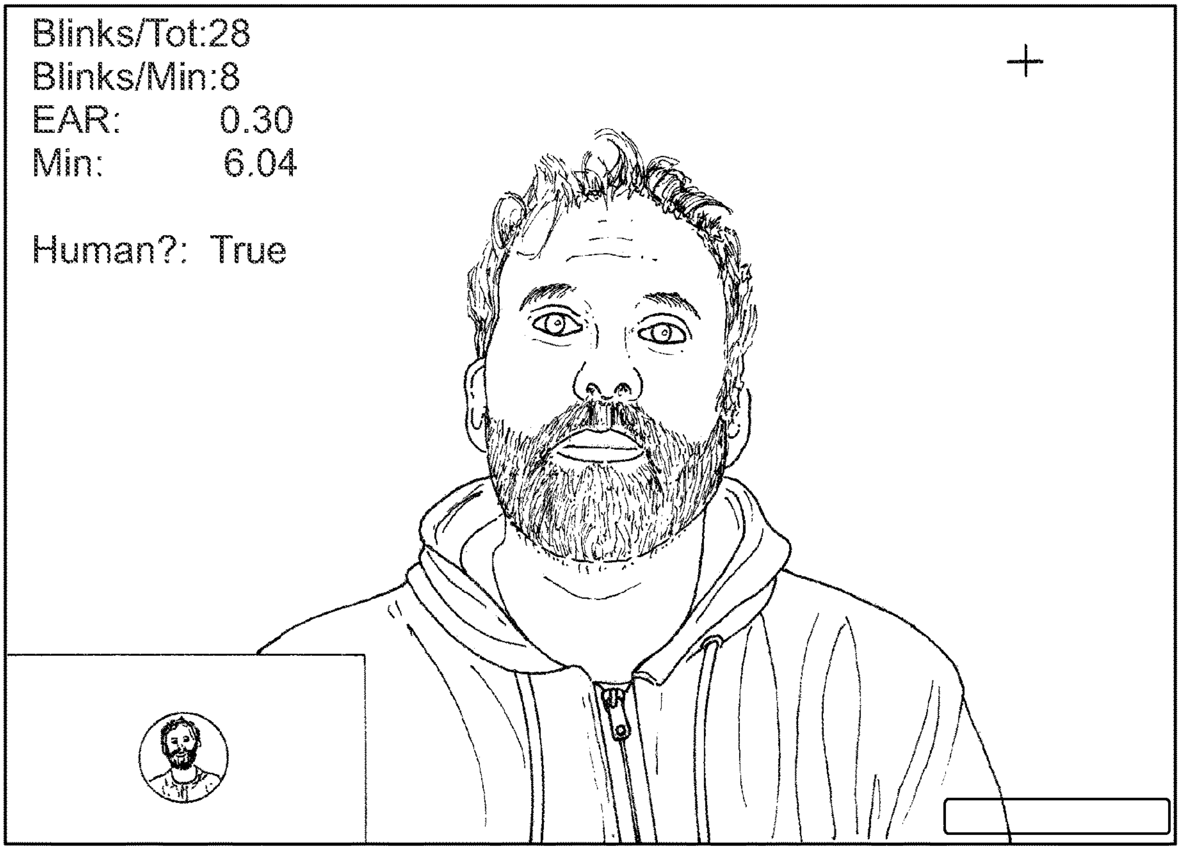
FIG. 6 shows a picture of a graphical user interface showing the results of the detection of eye blinks and calculation of the eye aspect ratio for a subject.
Figure 7:
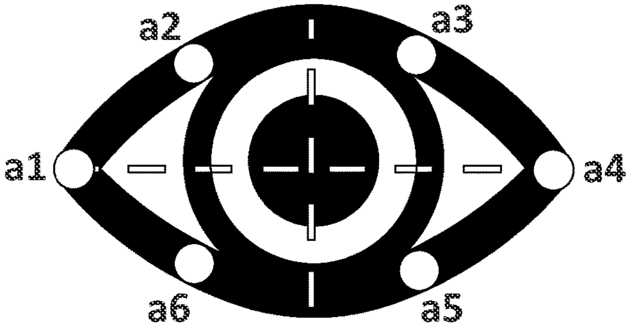
FIG. 7 shows a representation of an eye and points of the eye to be detected for blink verification.

The basic operating scheme of Blink Verification is shown in FIG. 5. Eye blinking is partly subconscious fast closing and reopening of the eyelid. The user using the graphical user interface (10) of the deepfake detector provides the detector with a video content in real time from one of multiple different input sources (100), such as the examples shown in FIG. 5: webcam (101), videoconference (102), and video file (103). Once the input source (100) has been assigned by the user, an eye detection process (500) begins. In a possible embodiment, blink vectors for each eye and their movement are checked as shown in FIG. 6 as in the case of the head pose verification, focusing on those key points that belong to the eye, which are shown in FIG. 7, and labelling them. The method checks (5000) if the detected points (a1, a2, a3, a4, a5, a6) of each eye are close to each other and calculates (5010) the translation vectors for each eye. For example, when blinking, considering the detected points (a1, a2, a3, a4, a5, a6) referred to the example of FIG. 7, points a2 and a6 are closer than when the eye is open, as points a3 and a5 are. Based on calculated the translation vectors of each detected eye, a final result (5100) is output indicating data about a deepfake based on the blink verification.

For Blink Verification, it is also essential to consider the speed, as too high or too low speed also reflects anomalies. Once appropriate thresholds are assigned, flicker is detected by using the Eye Aspect Ratio (EAR) model. To use the EAR model to detect flicker in videos, the following steps have been followed:

- Calculate the EAR for each eye in each video frame. The EAR is defined as the ratio of the length of the lateral canthus and medial canthus points to the length of the line joining the midpoint of the eye and the lateral canthus.
- Use an EAR threshold to detect flicker. Blinking is considered to have occurred when the EAR value falls below the threshold.
- Calculate the blinking frequency from each blink's start and end times.
- Calculate the speed of eye closure.

Some of the EAR thresholds tested in an implementation example are as follows:

- For adults: an EAR threshold of 0.20 is a reasonable starting point. If the EAR value falls below 0.20, blinking can be considered to have occurred.
- For children: Children may have a higher blinking frequency than adults, so that a lower EAR threshold may be necessary. An EAR threshold of 0.18 may be adequate to detect blinks in children.

On the other hand, some thresholds based on the number of blinks that have been tested in an implementation example are as follows:

- For adults: in 1 minute, an adult's typical number of blinks is approximately 15-20. A threshold for detecting an abnormally low number of blinks can be 5-10 blinks per minute, while a threshold for detecting an abnormally high number can be 30-35 blinks per minute.
- For children: Children may have a higher blinking frequency than adults, so the average number of blinks for a child in 1 minute can be up to 30. A threshold for detecting an abnormally low number of blinks in a child is 10-15 blinks per minute, while a threshold for detecting an abnormally high number is 40-45.

Another example of code implementation to detect the blinks and calculate the blinks per minute (EAR) is disclosed as follows:

```
# Blink detected
if ear < EAR_THRESH:
    aux_counter += 1
else:
    if aux_counter >= NUM_FRAMES:
        aux_counter = 0
        blink_counter += 1
        blink_minute += 1
# Blinks per minute
if elapsed_time >= blinktime:
  humanblink=is_blink_rate_normal(blink_counter)
  initial_time = time.time( )
  blink_minute = 0
```

This blink detection method works more accurately and faster than other methods based on Machine Learning models.

The method provides, in real-time, at least a result related to the detection of a deepfake or synthetic content in the video images.

All or a subset of the verification data that have been described as the output of the detection method can be used to produce an evaluation on whether the person appearing in the video is a real human or on the contrary is a deep fake, that is, a synthetic video generated by an artificial intelligence. This evaluation can be a confidence score, for example "real human with 97% probability", a binary evaluation human/deep fake, or a warning of the suspicion that it is a deep fake.

A possible implementation of the method provides a subset of the described possible verifications and provides a binary evaluation of deep fake in case a number of verifications is higher than a threshold providing a result suspicious not to be human. This threshold can be of a single criterion for an increased security, meaning that a single verification providing doubtful results can trigger an evaluation of the video as a deep fake. It should be noted that this binary output is subject to false positives and false negatives, that is, real humans classified as deep fakes and the opposite.

Instead of a binary evaluation, the outcome of another possible embodiment can be a warning of the suspicion that it is a deep fake. Therefore, the information to the user is less categoric, and thus can be clearer in terms of the setting the expectations for users of the detection method. As in the case of the binary evaluation, a subset of the possible verifications described before are conducted. In this case, a warning of the possibility of a deep fake is provided to the user, preferably when at least one of the verifications provides a result suspicious not to be human.

In another possible embodiment, there may be some criteria that can more certainly determine that the video is a deep fake, for instance the head abrupt turns, whilst other may be less categoric. An example of the latter is the blink frequency criteria, which due to the different behavior of each human-being may not provide a categoric classification of deep fakes. According to this embodiment one of the former more categoric criteria is sufficient to classify a video as deep fake or to provide a warning about the video being suspicious to be a deep fake (not human), but suspicious results in more than one of the latter criteria may be needed to provide this classification of deep fake or the warning.

Another possible embodiment provides a confidence score of the video being a real human, for instance as a percentage (0-100%). This score is the result of a weighted average of the confidence scores provided by each individual criterion, where each of the criteria has a weight, proportional to its relevance.

$$C = w_1 * c_1 + w_2 * c_2 + \ldots + w_n * c_n$$

where:

c is the weighted confidence score [0-100%]

$c_n$ is the confidence score [0-100%] of the criterion n, and $w_n$ is the weight of the criterion n [0-1]

$$w_1 + w_2 + \ldots + w_n = 1$$

A weighted confidence score of 0 means total certainty of the video being a deep fake, and a growing weighted confidence score means increasing certainty of the video being a real human, until the weighted confidence score of 100% meaning total certainty of the video being a real human.

Those criteria being more decisive have a higher weight than those less relevant. For instance, the blink frequency criterion may have a lower weight than the head abrupt turns criterion.

Several factors can affect the final results of the deepfake detection or final detection outcome.

Firstly, the framerate plays a significant role, as not all video conference connections offer the same speed. This factor is essential for determining appropriate guidelines or timing to achieve optimal results. Consequently, the detection method relies on two key elements: the framerate and the checking time. The better the framerate and the more testing time allocated, the more accurate the final analysis.

Secondly, time is another critical aspect that defines the duration of the deepfake check. As mentioned, allocating sufficient time is vital for obtaining an excellent final result. Additionally, the webcam's resolution, quality, and interpretation of natural or artificial lighting surrounding the individual are crucial factors. A high-quality webcam or one poorly aligned with the person in front of it can significantly impact the final detection outcome. Lighting also plays a pivotal role and directly affects the final result, and these factors can cause distortions in the final estimates obtained by the abovementioned methods.

In conclusion, achieving the best possible deepfake detection results necessitates considering various factors, such as framerate, time checking, webcam quality, and lighting conditions. By carefully considering these elements, we can enhance the accuracy and reliability of our deepfake detection approach and better safeguard users against the threat of manipulated content.

There are several improvements for the above-described embodiments of deepfake detection based on head movements and vector-detected blinking to increase its accuracy:

- Using more landmarks: Using more landmarks on the face and those used for blink calculation can increase detection accuracy. For example, landmarks on the jaw or forehead can be used to calculate head movement.
- Incorporating temporal information: Detection accuracy can be improved by incorporating temporal information about head movements and blinking. For example, object tracking techniques can be used to estimate the trajectory of landmarks over time and analyze movement patterns over time.
- Combining with other detection techniques: It is possible to combine detection based on head movements and blinking with other deepfake detection techniques, such as compressive artifact detection or image anomaly detection (for example, combining it to detect deepfake artifacts and iris reflections using Machine Learning).

Using semi-supervised learning techniques: Instead of relying entirely on a mathematical computation-based approach, combining semi-supervised learning techniques can be used. This can involve using a labeled dataset to train a machine learning model in detecting deepfakes and then using that model to guide analysis based on mathematical calculations.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A computer-implemented method for detecting synthetic content in videos, the method comprising obtaining at least an image to be analysed from a video, the image containing at least one body part of a subject, the at least one body part comprising at least a head of the subject, and the method comprising the following steps executed by one or more processors:

obtaining a plurality of three-dimensional points corresponding to the at least one body part and collecting information for each of the obtained three-dimensional points;

calculating in real-time three-dimensional vectors comprising information of position and movement of the plurality of the obtained three-dimensional points to detect spatial positions of the body part;

detecting anomalies in real-time by comparing the calculated three-dimensional vectors with reference information of points corresponding to the at least one body part stored in matrices and verifying at least one criterion according to at least a frequency of eye blink or to a pose of the subject's head; and providing a result in real-time indicating whether a synthetic content is detected in the video, the result being based on the detected anomalies and each verified criterion.

2. The method according to claim 1, wherein detecting anomalies further comprises using a combination of translation and rotation to calculate motion values of the obtained three-dimensional points and generating homogeneous transformation matrices with the calculated motion values.

3. The method according to claim 1, wherein detecting anomalies further comprises using a camera projection matrix of a camera configured to capture the video, the camera projection matrix being used to map the obtained three-dimensional points in space to their two-dimensional projections in the obtained image.

4. The method according to claim 1, wherein the at least one verified criterion is the pose of the subject's head and the detected anomalies comprise at least one of:

i) movements of the subject's head having a speed that exceeds a predetermined first threshold, ii) turns of the subject's body part having a speed that exceeds a predetermined second threshold, iii) anomalies with respect to facial symmetry, iv) movements of another body part of the subject, different from the subject's head, having a speed that exceeds a predetermined first threshold anomalies with respect to a focal point, v) anomalies with respect to facial expressions related to emotions, and/or vi) anomalies with respect to movement of lips of the subject's lips.

5. The method according to claim 1, wherein the at least one verified criterion is the frequency of eye blink and detecting anomalies comprises at least one of: calculating the frequency from a start time and an end time of eye blink and calculating a speed of eye closure.

6. The method according to claim 1, wherein the information of the obtained three-dimensional points is collected either in real-time from the video being currently captured by a camera or from the video previously recorded by the camera.

7. The method according to claim 1, wherein detecting anomalies is performed during a video call.

8. The method according to claim 1, wherein detecting anomalies is adjusted to a frame rate defined by frames per second of the video.

9. The method according to claim 1, wherein the video is received from an input source selected from a webcam, a videoconference and a video file.

10. The method according to claim 1, wherein the provided result is a weighted average of a confidence score of the video being a real human calculated for each of the criteria, where a weight is assigned to each criterion according to a relevance of the criterion.

11. The method according to claim 1, wherein the provided result is a subset of verification data obtained in verifying the at least one criterion.

12. The method according to claim 1, wherein the provided result is a binary evaluation between real human and deep fake.

13. The method according to claim 1, wherein the provided result is a warning generated to notify a user about a deep fake.

14. The method according to claim 1, further comprising displaying by a user interface the obtained three-dimensional points.

15. The method according to claim 1, wherein the steps are executed by one processor of a personal computer, a laptop, a tablet, a smartphone or any programmable device providing a video player.

* * * * *